(12) United States Patent
Park et al.

(10) Patent No.: US 6,841,303 B2
(45) Date of Patent: Jan. 11, 2005

(54) HIGH IONIC CONDUCTIVITY GEL POLYMER ELECTROLYTE FOR RECHARGEABLE POLYMER BATTERIES

(75) Inventors: Chi-Kyun Park, Flanders, NJ (US); Zhiwei Zhang, Basking Ridge, NJ (US); Lu Ying Sun, Randolph, NJ (US); Chul Chai, Saddle River, NJ (US)

(73) Assignee: SKC Co., Ltd., Suwon (KR)

( * ) Notice: Subject to any disclaimer, the term of this patent is extended or adjusted under 35 U.S.C. 154(b) by 35 days.

(21) Appl. No.: 09/986,459

(22) Filed: Nov. 8, 2001

(65) Prior Publication Data

US 2002/0136959 A1 Sep. 26, 2002

Related U.S. Application Data

(63) Continuation-in-part of application No. 09/760,720, filed on Jan. 17, 2001, now abandoned.

(51) Int. Cl.$^7$ .............................................. H01M 6/16
(52) U.S. Cl. ...................................... 429/303; 252/62.2
(58) Field of Search ................................ 429/300, 303; 252/62.2

(56) References Cited

U.S. PATENT DOCUMENTS

| | | | | |
|---|---|---|---|---|
| 4,383,103 A | | 5/1983 | Kluger | |
| 5,202,009 A | * | 4/1993 | Andrieu et al. | 204/296 |
| 5,270,134 A | | 12/1993 | Tobishima et al. | 429/197 |
| 5,296,318 A | | 3/1994 | Gozdz et al. | 429/192 |
| 6,063,522 A | | 5/2000 | Hamrock et al. | 429/200 |
| 6,120,696 A | | 9/2000 | Armand et al. | 252/622 |
| 6,420,072 B1 | * | 7/2002 | Maruyama et al. | 429/303 |

FOREIGN PATENT DOCUMENTS

| | | | |
|---|---|---|---|
| WO | WO 99/65101 | 12/1999 | H01M/10/42 |

OTHER PUBLICATIONS

Andrieu et al., "Solid Polymer Electrolytes Based on Statistical Poly(ethylene Oxide–Propylene Oxide) Copolymers", Electrochimica Acta (1995), 40 (13–14), pp. 2295–2299.*

Arbizzani et al. ("Impedance Spectroscopy in electrode/electrolyte interface investigations", Solid State Ionics, 72, (1994) pp. 115–121).*

New Thin–Layer Solid State Lithium Polymer Batteries; S. Passerini, S. Loutzky and B. Scrosati; J. Electrochem. Soc., vol. 141, No. 7, Jul. 1944© The Electrochemical Society, Inc. L80–L81.

Li$^+$–Conductive Solid Polymer Electrolytes with Liquid–Like Conductivity; K.M. Abraham$^*$ and M. Qalamgir$^*$; EIC Laboratories, Incorporated, Norwood, Massachusetts 02062; $^*$Electrochemical Society Active Members; J. Electrochem. Soc., vol. 137, No. 5, May 1990 © pp. 1657–1658 The Electrochemical Society, Inc.

* cited by examiner

Primary Examiner—Susy Tsang-Foster
(74) Attorney, Agent, or Firm—Nixon & Vanderhye P.C.

(57) ABSTRACT

Ionic gel polymer electrolytes for rechargeable polymer batteries preferably are formed by dissolving a gelling agent into organic liquid electrolytes, and then gelling the precursor in situ at elevated temperature after pouring it into a battery case that contains a cathode, an anode and a separator. The gel polymer electrolytes exhibit excellent ionic conductivity of up to about $10^{-2}$ S/cm and voltage stability for lithium rechargeable batteries. Most preferably, the gel polymer electrolyte is the reaction product of (A) a heterocyclic amine-group containing material (preferably a vinylpyridine), and (B) halide or epoxy-group containing polymers, copolymers, oligomers or monomers that are capable of reacting with nitrogen-containing compounds, such as polymers, copolymers, oligomers or monomers containing alkylene halides or halomethyl group substituted aromatic units or at least one epoxy unit.

18 Claims, 1 Drawing Sheet

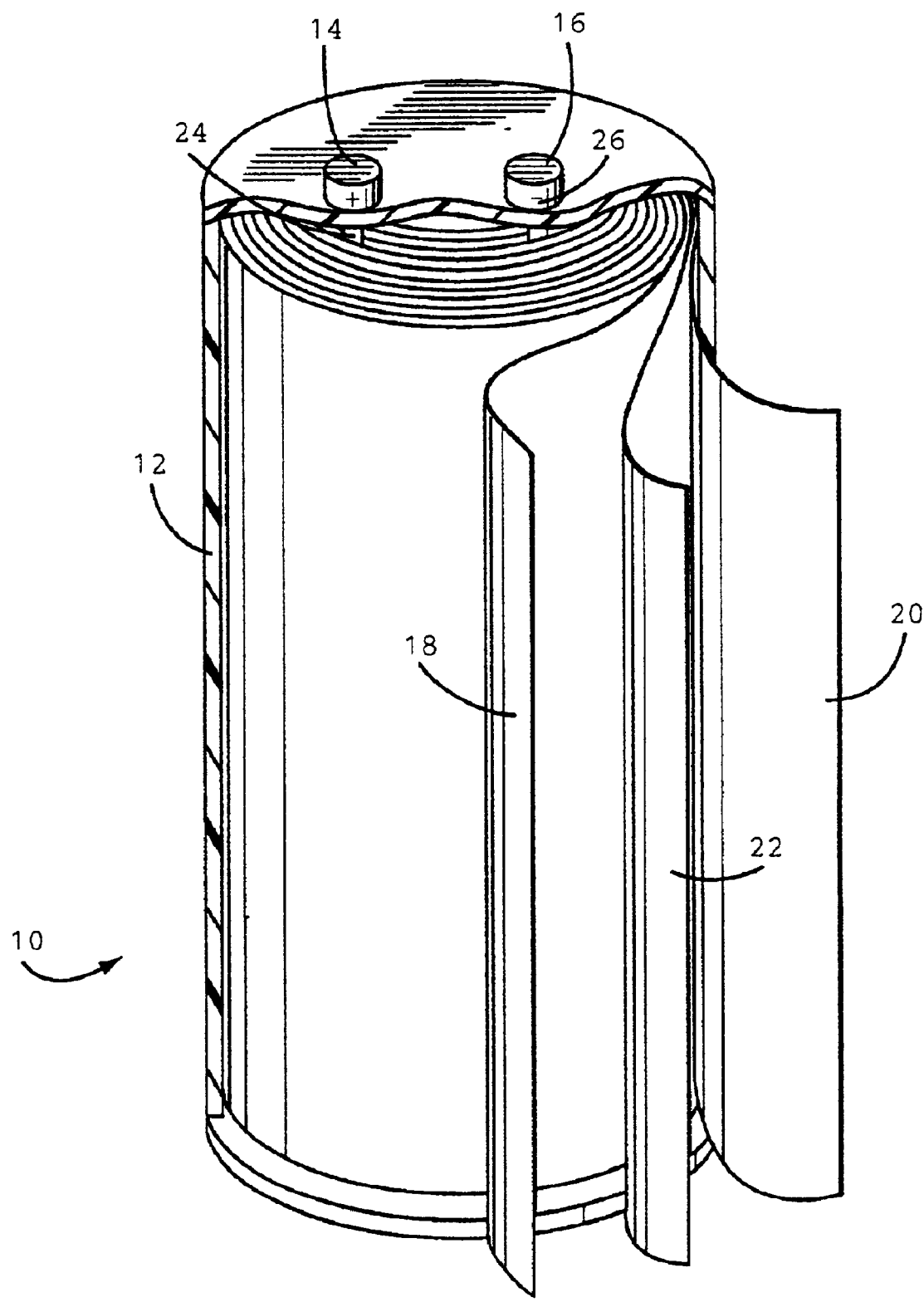

HIGH IONIC CONDUCTIVITY GEL POLYMER ELECTROLYTE FOR RECHARGEABLE POLYMER BATTERIES

CROSS-REFERENCE TO RELATED APPLICATION

This application is a continuation-in-part (CIP) of commonly owned, U.S. patent application Ser. No. 09/760,720 filed on Jan. 17, 2001, now abandoned, the entire content of which is expressly incorporated hereinto by reference.

FIELD OF THE INVENTION

The present invention relates generally to ionic gel polymer electrolytes for rechargeable polymer batteries. In preferred forms, the present invention is embodied in forming a gel polymer precursor electrolyte by dissolving a gelling agent into organic liquid electrolytes, and then gelling the precursor in situ at elevated temperature by pouring it into battery case that contains a cathode, an anode and a separator. The gel polymer electrolytes of the present invention exhibit excellent ionic conductivity of up to about $10^{31\ 2}$ S/cm and voltage stability for lithium rechargeable batteries.

BACKGROUND AND SUMMARY OF THE INVENTION

Lithium rechargeable batteries are classified according to the kind of electrolyte used. Thus, lithium rechargeable batteries are generally classified into liquid electrolyte lithium ion batteries and polymer electrolyte lithium ion batteries. Lithium ion polymer batteries using solid polymer electrolytes are advantageous since there is no danger of electrolyte solution leakage. Furthermore, lithium ion polymer batteries can be manufactured in an ultra-thin battery shape. As a result, there have been increased efforts to commercialize lithium ion batteries that use solid polymer electrolytes. In addition, lithium ion polymer batteries are typically lighter weight, exhibit lower vapor pressures and smaller discharge rates as compared to lithium ion batteries that use liquid electrolyte. Due to such characteristics, lithium ion polymer batteries are safer than their liquid electrolyte battery counterparts and can be easily manufactured into angular batteries or large-sized batteries.

Polymer electrolytes used in lithium ion polymer batteries generally include pure solid polymer electrolytes, gel-type polymer electrolytes, hybrid polymer electrolytes and the like. The pure solid polymer electrolyte produces a thin film by a solvent evaporation coating, with specific examples thereof including graft polyether electrolytes, polysiloxane electrolytes, and the like.

Gel type polymer solid electrolytes that produce a polymer host structure and a stable cell by the addition of an electrolytic solution typically exhibit higher ionic conductivities as compared to pure solid polymer electrolytes and thus yield better cell performance. In order to compensate for the weakness in mechanical properties of the gel-type polymer electrolytes, crosslinking or thermosetting materials are generally further added during their preparation. The ionic conductivity of the polymer solid electrolyte is based on the mobility of ion species in an electrolytic solution.

Examples of gel-type polymer solid electrolytes include electrolytes prepared by forming a mixture of ethylene glycol and dimethacrylate and then irradiating the mixture with ultraviolet (UV) radiation. While such an electrolyte exhibits excellent flexibility, it is liable to be hardened by heat after UV irradiation, which makes further processing impossible. In the case of fabricating a battery using a polymer electrolyte, the interface resistance between an electrode and electrolyte increases, thereby making it extremely difficult to use such an electrolyte in practice. Another example of a gel-type polymer solid electrolyte includes a crosslinked polyethyleneoxide electrolyte which is prepared by crosslinking polyethylene oxide to reduce crystallinity. As a result, the ionic conductivity of the electrolyte can be improved to a maximum of $10^{-5}$ S/cm, which is still unsatisfactory to be used as a room-temperature type lithium rechargeable battery. Another example of gel-type polymer electrolyte includes polyacrylonitrile-based electrolytes which are prepared by dissolving polyacrylonitrile in an electrolytic solution and making a gel with the temperature of the resultant structure further reduced. (See, Abraham et al, *J. Electrochem. Soc.*, 137, 1657 (1990); and Passerini et al, *J. Electrochem. Soc.*, 141 80 (1994), the entire content of each publication being expressly incorporated hereinto by reference). The thus obtained electrolyte, while exhibiting good ionic conductivity of $10^{-3}$ S/cm, has poor mechanical strength and does not exhibit uniform electrical impregnation characteristics.

Hybrid polymer electrolytes have been prepared by injecting an electrolytic solution into a porous polymer matrix having fine pores of less than sub-micron dimension. (See, U.S. Pat. No. 5,296,318, the entire content of which is incorporated hereinto by reference.) The pores of the polymer matrix serve the role as a pathway for the liquid electrolyte and which are thus filled with the electrolyte to give a good ionic conductivity reaching $3\times10^{-3}$ S/cm. However, production of such a hybrid polymer electrolyte system requires a plasticizer extraction step, which requires a substantial amount of time (e.g., about 1 hour). Furthermore, a substantially large amount of organic solvent, such as ether or methanol, is needed to prepare the polymer matrix thereby necessitating a refining facility for recycling the used organic solvent.

As described above, in the case of using the gel-type polymer electrolyte and the hybrid polymer electrolyte, the polymer matrix must be impregnated with a relatively large amount of electrolytic solution to obtain a good ionic conductivity characteristic. However, existing polymer electrolytes still are unsatisfactory in terms of their ionic conductivities and battery assembly processes.

To solve the above problems, it is one object of the present invention to provide a composition for forming gel polymer electrolytes having improved ionic conductivity. Another object of the present invention is to provide a simplified rechargeable battery manufacturing process employing a polymer electrolyte using the composition for gel forming polymer electrolytes.

To achieve the objects of the present invention, there is provided a composition for gel forming polymer electrolytes having a gelling agent and liquid electrolyte. Heating a composition comprised of the gelling agent and liquid electrolyte gives an ionic structure on the crosslinked polymer chain which results in a high ionic conductive gel polymer. The gelling agent most preferably includes at least one material selected from polymers, copolymers, oligomers or monomers containing primary, secondary or tertiary amines as a nitrogen source. In addition, at least one material can be selected from polymers, copolymers, oligomers or monomers containing organic halides that that are capable of reacting with a nitrogen group at an elevated temperature. The gelling agents are dissolved into organic liquid electrolytes containing between about 0.5 M to about 2 M of ionic salts. The solution is then heated to an elevated temperature (e.g., between about 30 to about 130° C.) to prepare the gel polymer electrolyte. Surprisingly, the ionic conductivities achieved by the gel polymer electrolyte formed according to the present invention is up to $1\times10^{-2}$ S/cm, which is a conductivity value similar to that of a liquid electrolyte.

To achieve the second object of the present invention, there is provided a lithium secondary battery having a cathode, an anode and a polymer electrolyte interposed between the cathode and the anode. A polyolefin (e.g., polypropylene or polyethylene) microporous separator sheet is used to separate the electrodes to prevent electrical shorting. The non-activated cell is placed into a suitable case (preferably a case formed of a thermoplastics material which is capable of being heat-sealed and which is inert to the cell contents). The gel electrolyte precursor liquid is then poured into the case. The case with the gel electrolyte precursor liquid therein is sealed and then subsequently heated to an elevated temperature and a time sufficient (e.g., about 65° C. for between about 1 to 7 days) to cause the gel precursor to gel (polymerize) in situ within the case thereby forming a rechargeable lithium ion polymer battery cell.

These and other aspects and advantages will become more apparent after careful consideration is given to the following detailed description of the preferred exemplary embodiments thereof.

BRIEF DESCRIPTION OF THE ACCOMPANYING DRAWING

Reference will be hereinafter made to the accompanying drawing FIGURE which depicts schematically a perspective view, partly sectioned, of a rechargeable battery in accordance with the present invention.

DETAILED DESCRIPTION OF THE INVENTION

It is well known that nitrogen groups can easily react with acid at room temperature (20° C.) and with organic halides at elevated temperatures. More specifically, ionic structures are generated by the chemical reaction of nitrogen moieties and organic halides at elevated temperatures. In rechargeable polymer batteries, the polymer electrolyte is one of the most important factors which contributes to the overall cell performance. One principal concern is to provide a polymer electrolyte that has a sufficiently high ionic conductivity. For this reason, recent development of lithium rechargeable batteries has concentrated on the providing sufficiently high ionically conductive polymer electrolyte.

The gelling agent in accordance with the present invention generally comprises at least two materials selected from the materials (A) and (B) noted below:

Material (A)—Polymers, copolymers, oligomers or monomers that are capable of reacting with halogen compounds or epoxy compounds, such as, polymers, copolymers, oligomers or monomers containing primary, secondary or tertiary amines. Especially preferred (A) materials secondary and tertiary amines that include polymers, copolymers, oligomers or monomers containing 6-membered aromatic heterocycles, 5-membered fused aromatic heterocycles and aromatic or non-aromatic secondary or tertiary amine compounds. Preferred 6-membered aromatic heterocycles include, for example, pyridine, pyridazine, pyrimidine, pyrazine and triazine compounds. Preferred 5-membered fused aromatic heterocycles include, for example, triazole, thiazole, and thiadiazole compounds. Preferred aromatic or non-aromatic secondary and tertiary amine compounds are those which contain five or more carbon atoms in addition to at least one nitrogen atom. Preferred aromatic tertiary amine compounds are heterocyclic amine group containing materials.

Material (B)—Virtually any polymers, copolymers, oligomers or monomers that are capable of reacting with nitrogen-containing compounds may be employed in the practice of the present invention. For example, polymers, copolymers, oligomers or monomers containing alkylene halides or substituted or non-substituted benzyl halides and/or polymers copolymers, oligomers or monomers containing at least one epoxy unit may be employed.

Especially preferred alkylene halides or substituted or non-substituted benzyl halides that may be employed as the (B) materials of this invention include aromatic and non-aromatic halides such as, for example, halomethyl benzene, halomethyl naphthalene, halomethyl biphenyl, bis(halomethyl) benzene, bis(halomethyl) naphthalene, bis(halomethyl) biphenyl, tris (halomethyl) benzene, tris(halomethyl) naphthalene, tris(halomethyl) biphenyl, tetrakis(halomethyl) benzene, tetrakis(halomethyl) naphthalene, tetrakis (halomethyl) biphenyl, and halomethylstyrene. Most preferably, the halomethyl group of such compounds is chloromethyl, bromomethyl or iodomethyl. Preferred non-aromatic halides include, for example, diiodo alkane, triiodo alkane, and tetraiodo alkane, where the alkane group has at least two carbon atoms.

Especially preferred halide compounds useable as material (B) include bis(bromomethyl)benzene, α,α'-dibromoxylene and diiodoalkanes.

Especially preferred epoxy group-containing materials that may be employed as material (B) in accordance with the present invention include, for example, epoxy-group containing material which is at least one selected from the group consisting of 3,4-epoxycyclohexylmethyl-3', 4'-epoxycyclohexane carboxylate, glycidyl dodecafluoroheptylether, polypropylene glycol diglycidyl ether, glycidyl dodecafluoroheptylether, butadiene diepoxide, butanediol diglycidyl ether, cyclo hexene oxide, cyclopentene oxide, diepoxy cyclooctane, ethylene glycol diglycidyl ether and 1,2-epoxy hexane.

Ionic gel polymer electrolyte can be prepared by dissolving the gelling agents into organic liquid electrolytes containing between about 0.5 M to about 2.0 M of ionic salts, and then heating the solution at an elevated temperature (30~130° C.) to create a crosslinked reaction product of the gelling agents in the form of a high ionic conductive gel.

The polymer electrolytes most preferably contain between about 1 wt. % to about 30 wt. % gelling agent and between about 30 wt. % to about 99 wt. % (advantageously about 95 wt. % or greater, for example, up to about 99 wt. %) of liquid electrolyte that comprises between about 0.5 M to about 2.0 M metal salts, most preferably a lithium salt such as $LiPF_6$, $LiAsF_6$, $LiClO_4$, $LiN(CF_3SO_2)_2$, $LiBF_4$, $LiCF_3SO_3$, $LiSbF_6$, and mixtures thereof, in an organic solvent. If the content of the gelling agent is less than 1 wt. %, the electrolyte cannot form a gel at elevated temperature. On the other hand, if the gelling agent content is greater than about 30 wt. %, the electrolyte becomes too viscous (rigid) thereby causing a deterioration of the cell performance. In this regard, the ionic conductivity of an electrolyte is in inverse proportion to its viscosity and thus increasing the viscosity of the gel electrolyte will significantly reduce its ionic conductivity property. However, the gel polymer electrolyte of the present invention surprisingly exhibits similar ionic conductivities as compared with that of conventional liquid electrolyte. While not wishing to be bound to any particular theory, it is believed that the surprisingly high ionic conductivities exhibited by the gel polymer electrolytes of the present invention may be due to a generation of ionic species on the polymer chain during gelling. While gelling of an electrolyte tends to increase its viscosity and reduce its ionic conductivity, the ionic structures on the polymer chain of the gel electrolyte of the present invention increase its ionic concentration and thus may be a contributing factor in the conductivity being comparable to those exhibited by conventional liquid electrolytes. Specifically, the ionic conductivities of the gel polymer electrolyte according to the present invention is about $1 \times 10^{-2}$ S/cm or less, and preferably between about $1 \times 10^{-3}$ to about $1 \times 10^{-2}$ S/cm. The particular ionic conductivity that may be achieved is dependent on the particular gelling agent composition and/or the type of electrolyte employed.

It has also been found that rechargeable batteries with the gel polymer electrolyte surprisingly exhibited during storage a pre-charged voltage between about 0.4V to about 0.65V. In direct contrast, substantially no pre-charged cell voltage is exhibited by rechargeable batteries which employ pure liquid electrolytes. It was discovered that the nitrogen group in the gel polymer electrolyte serves to increase the cell voltage before the cell is actually charged. No clear answer for this phenomenon is known, but it may be due to the neutralization of the electrolyte. In this regard, organic liquid electrolyte with $LiPF_6$ contains a small amount of hydrogen fluoride and Lewis acid, such as $PF_3$. The nitrogen compound can thus easily capture the hydrogen fluoride and Lewis acid in the electrolyte. If the acids can partially oxidize anode active material to increase its potential to a level similar to $LiCoO_2$, a cathode active material, then the liquid electrolyte can make the cell voltage near zero. The low potential of rechargeable batteries has been a problem because it corrodes the copper current collector at near zero voltage. Thus, rechargeable battery manufacturers cannot store the batteries for a long time after activating the batteries with liquid electrolyte. However, according to the present invention, gel polymer electrolytes provided with a relatively small amount of nitrogen-group containing compound as an additive will serve to maintain the cell voltage more than 0.3V thereby allowing for relatively long storage time storage before being charged. For this purpose, the necessary amount of nitrogen-group containing compound can be varied due to the concentration of acids in the electrolyte, but preferably is between about 0.01 to about 5.0 wt. %, based on the total weight of the gel polymer electrolyte.

It has therefore been found that the ionic gel polymer electrolyte according to the present invention has an excellent ionic conductivity and voltage stability suitable for rechargeable batteries.

An exemplary rechargeable battery 10 in accordance with the present invention is depicted schematically in the accompanying drawing FIGURE. As shown therein, the battery 10 generally is comprised of a battery case 12 having external anode and cathode posts 14, 16, respectively. The battery case 12 houses a spirally wound laminate (colloquially known as a "jelly roll") comprised of an anode sheet 18 (e.g., carbon), a cathode sheet 20 (e.g. formed of a lithium oxide material such as $LiCoO_2$, $LiNiO_2$ and $LiMn_2O_4$), and a separator sheet 22 (e.g., formed of a microporous polymeric material such as polyethylene, polypropylene or the like) interposed between the anode and cathode sheets 18, 20, respectively. The anode and cathode posts 14, 16 are connected operatively to the anode and cathode sheets 18, 20 by suitable electrical connections 24, 26, respectively. It is noted here that the anode sheet 18, cathode sheet 20 and separator 22 are depicted in the accompanying drawing FIGURE as being fanned-out for purposes of illustration only. In practice, therefore, such sheets will be housed entirely within the battery housing 12. In order to be functional as an electrochemical cell, the battery housing 12 will also contain the high ionic conductivity gel polymer electrolyte as described previously, but which is not depicted in the accompanying drawing FIGURE.

The present invention will now be further described by the following non-limiting examples.

EXAMPLE 1

An anode active material was prepared by dissolving 100 g of poly(vinylidene fluoride) (PVDF, Solvay 1012) into 800 g of 1-methyl-2-pyrrolidone (NMP, Aldrich) using a plenary mixer. 1000 g of mesophase carbon micro beads (MCMB 25-28, Osaka gas) and 15 g of acetylene black (Chevron) were added into the PVDF solution and mixed by a plenary mixer. The anode active material slurry was coated on both surfaces of a copper foil using a die coater, dried and pressed to prepare a 200 $\mu$m thickness anode.

A cathode active material was prepared by dissolving 50 g of PVDF (Solvay) was dissolved into 1100 g of NMP (Aldrich) using a plenary mixer. 1000 g of $LiCoO2$ (Seimi) and 40 g of acetylene black were added into the PVDF solution and mixed by plenary mixer. The cathode active material slurry was coated on both surfaces of an aluminum foil using a die coater, dried and pressed to prepare a 180 um thickness cathode The anode, cathode and separator (25 $\mu$m, Celpard® 2300 microporous film) were stacked or folded or winded and then placed into a plastic case capable of being heat-sealed.

EXAMPLE 2

A plastic case containing an anode, cathode and separator was prepared by the same procedure as in Example 1 except a polyethylene separator (13 $\mu$m Celgard® K835 microporous film) was used.

EXAMPLE 3

1.4 g of poly(2-vinylpyridine-co-styrene), PVPS: Aldrich, was dissolved into 100 g of 1M LiPF6 in 1:1:1 v % ethylene carbonate:diethyl carbonate:dimethyl carbonate (EC:DEC:DMC. Ferro 7500) at room temperature. Subsequently, 0.7 g of α,α'-dibromo-m-xylene (DBX, Aldrich) was then mixed with the solution. DBX was purified before using by sublimation at 65° C. or by a recrystallization method in a 1:3 mixture solvent of acetone and ethanol.

The resultant electrolyte solution was checked to determine its ionic conductivity at 25° C. both before and after it was gelled using an Oaklon conductivity meter. The ionic conductivity of the electrolyte solution without gelling agent was determined to be $7.8 \times 10^{31}$ $^3$ S/cm while the ionic conductivity of the electrolyte gel was determined to be $7.3 \times 10^{-3}$ S/cm. The gel electrolyte employing 1M LiPF6 in 1:1 wt. % EC:DMC (EM30) without gelling agent showed $1.1 \times 10^{-2}$ S/cm but the ionic conductivity of the electrolyte gel was $1.0 \times 10^{-2}$ S/cm at 25° C.

The gel electrolyte employing 1M LiPF6 in 1:1:1 v % EC:DEC:DMC was injected into each of the plastic cases formed according to Examples 1 and 2 under an argon gas atmosphere. The cases were then sealed at 170° C. using bar sealer and heated at 65° C. for 36 hrs to prepare a rechargeable polymer battery. Table 1 below shows the respective cell gelling times at 65° C. and capacity retention at a 1C-discharge rate.

TABLE 1

|  | Gelling time, hrs | | Capacity retention at 1C |
| --- | --- | --- | --- |
|  | 55° C. | 65° C. | discharge rate, % |
| Example 1 | >40 | 29 | 93 |
| Example 2 | >40 | 29 | 95 |

EXAMPLE 4

The gel precursor electrolytes were prepared by the same procedure as in Example 3, except for a variation in the PVPS and DBX compositions. Several rechargeable polymer cells were prepared using the gel polymer electrolyte and, Celpard® 2300 microporous film as a separator. In addition, a liquid electrolyte cell (Lithium Ion Battery) that did not contain PVPS and DBX was prepared to compare its performance with the gel polymer electrolyte cells in accordance with this invention. Table 2 below shows the electrolyte compositions, their gelling times at 65° C. and ionic conductivities before and after gelling of the electrolytes. Table 2 also shows the respective open circuit voltage(OCV) for each cell after storage 24~36 hrs at 65° C. and their capacity retention at 1C-discharge rate. The charging upper voltage limit of the cells was 4.2V and discharge cutoff voltage was 3.0V.

TABLE 2

Gelling time, OCV and ionic conductivities of polymer electrolytes

| Gram of gelling agent in 100 g of liquid electrolyte | Gelling time, hrs | | Ionic conductivity of gel electrolyte, mS/cm | | OCV of polymer battery | Capacity retention at 1C discharge rate, % |
| --- | --- | --- | --- | --- | --- | --- |
| | 25° C. | 65° C. | Before gel | After gel | | |
| 0 % | No gel | No gel | 7.9 | | 0.00 | 94.1 |
| PVPS: 1.65 g, DBX: 0.5 g | | 26 | 7.35 | 7.28 | 0.54 | 92.7 |
| PVPS: 1.65 g, DBX: 0.83 g | | 10~22 | 7.45 | 6.98 | 0.64 | 92.3 |
| PVPS: 1.65 g, DBX: 1.16 g | | 10~22 | 7.39 | 6.93 | 0.57 | 92.0 |
| PVPS: 1.65 g, DBX: 1.45 g | | 10~22 | 7.63 | 6.69 | 0.49 | 91.9 |
| PVPS: 1.75 g, DBX: 0.58 g | | 24 | 7.37 | 7.12 | 0.54 | 92.2 |
| PVPS: 2 g, DBX: 0.66 g | | 8~20 | 7.34 | 6.94 | 0.53 | 93.3 |
| PVPS: 2.25 g, DBX: 0.74 g | | 8~20 | 7.26 | 6.59 | 0.46 | 94.0 |
| PVPS: 2.5 g, DBX: 0.83 g | | 7 | 7.23 | 6.68 | 0.52 | 93.8 |
| PVPS: 3 g, DBX: 0.99 g | | 5 | 6.92 | 6.60 | 0.52 | 92.7 |
| PVPS: 1.75 g, DBX: 0.88 g | | 8~22 | 7.51 | 7.41 | 0.60 | 93.3 |
| PVPS: 2 g, DBX: 1 g | | 8~22 | 7.64 | 7.08 | 0.64 | 92.5 |
| PVPS: 2.25 g, DBX: 1.13 g | | 6 | 7.09 | 6.32 | 0.52 | 94.2 |
| PVPS: 2.5 g, DBX: 1.25 g | | 8 | 7.05 | 6.45 | 0.59 | 91.1 |

EXAMPLE 5

Three different electrolytes were prepared by dissolving 2 g of PVPS in 98 g of 1M LiPF6 electrolyte (Electrolyte 1), 2 g of DBX in 98 g of 1M LiPF6 electrolyte (Electrolyte 2) and 2 g of 3,4-epoxycyclohexylmethyl-3',4'-epoxycyclohexanecarboxylate (ECMEC) in 98 g of 1M LiPF6 electrolyte (Electrolyte 3) respectively. These electrolytes were injected into plastic cases containing a cathode, an anode and a separator under an argon gas atmosphere. The cases were then heat-sealed at 170° C. by using bar sealer and heated at 65° C. for 36 hrs. Table 3 below shows the open circuit voltage (OCV) for each cell and its relationship with copper corrosion before and after heat treatment.

TABLE 3

| | Open Circuit Voltage, V | | Copper foil after 65° C. |
| --- | --- | --- | --- |
| | Before heating | After heating | storage for 36 hrs |
| Electrolyte 1 | 0.434 | 0.633 | No corrosion |
| Electrolyte 2 | 0.037 | 0.029 | Corrosion (Black color) |
| Electrolyte 3 | 0.039 | −0.003 | Corrosion (Black color) |

EXAMPLE 6

Gel-forming electrolytes were prepared by the same procedure as in Example 3 except diiodopropane (DIP) was used instead of DBX.

EXAMPLE 7

Gel-forming electrolytes were prepared by the same procedure as in Example 3 except 3,4-epoxycyclohexylmethyl-3', 4'-epoxycyclohexanecarboxylate (ECMEC) was used instead of DBX.

EXAMPLE 8

Gel-forming electrolytes were prepared by the same procedure as in Example 3 except poly(2-vinylpyridine), PVP, Polysciences Inc., was used instead of PVPS. Table 4 shows the compositions, gelling time at 45° C. and 65° C. and ionic conductivities of the gel electrolytes prepared by Example 6 through Example 8 compared with the gel electrolyte which was prepared with PVPS and DBX

TABLE 4

| Gram of gelling agent in 100 g of liquid electrolyte | Gelling time, hrs | | |
|---|---|---|---|
| | 25° C. | 45° C. | 65° C. |
| PVPS: 2 g, DBX: 0.66 g | No gel within 24 hours | 36~48 (55° C.) | 8~20 |
| PVPS: 2 g, DIP: 0.66 g | | No gel | >72 |
| PVPS: 2.5 g, DIP: 0.75 g | | na | 60~72 |
| PVPS: 2.5 g, ECMEC: 0.75 g | | — | 2 |
| PVPS: 5 g, ECMEC: 0.1 g | | No gel | |
| PVPS: 5 g, ECMEC: 0.7 g | | 18 | <1 |
| PVPS: 5 g, ECMEC: 2.5 g | | 1 | <1 |
| PVPS: 5 g, ECMEC: 5 g | | 21~24 | 2 |
| PVPS: 5 g, ECMEC: 10 g | | — | 21 | na = not available

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gel polymer electrolyte for rechargeable batteries comprising:
   (i) a gel polymer which is the reaction product of (A) a poly(2-vinyl-pyridine-co-styrene) compound, and (B) an epoxy-group containing material, and
   (ii) a liquid electrolyte which contains an amount of an ionic salt effective to achieve ionic conductivity of about $1 \times 10^{-2}$ S/cm or less.

2. The gel polymer electrolyte as in claim 1, wherein the epoxy-group containing material is butanediol diglycidyl ether.

3. The gel polymer electrolyte of claim 1, wherein the ionic salt is a lithium salt.

4. The gel polymer electrolyte of claim 3, wherein the lithium salt is at least one selected from the group consisting of $LiPF_6$, $LiAsF_6$, $LiClO_4$, $LiN(CF_3SO_2)_2$, $LiBF_4$, $LiCF_3SO_3$ and $LiSbF_6$.

5. The gel polymer electrolyte of claim 1, wherein the ionic salt is present in an amount effective to achieve an ionic conductivity of between about $1 \times 10^{-3}$ to about $1 \times 10^{-2}$ S/cm.

6. The gel polymer electrolyte of claim 1, wherein material (B) is an epoxy-group containing material which is at least one selected from the group consisting of 3,4-epoxycyclohexylmethyl-3', 4'-epoxycyclohexane carboxylate, glycidyl dodecafluoroheptylether, polypropylene glycol diglycidyl ether, glycidyl dodecafluoroheptylether, butadiene diepoxde, butanediol diglycidyl ether, cyclo hexene oxide, cyclopentene oxide, diepoxy cyclooctane, ethylene glycol diglycidyl ether and 1,2-epoxy hexane.

7. The gel polymer electrolyte of claim 1, wherein the gel polymer is present, based on the total weight of the gel polymer electrolyte, in an amount between about 1 wt. % to about 30 wt. %.

8. The gel polymer electrolyte of claim 1 or 7, wherein the liquid electrolyte is present, based on the total weight of the gel polymer electrolyte, in an amount between about 30 wt. % to about 99 wt. %.

9. The gel polymer electrolyte of claim 1, wherein the liquid electrolyte is present, based on the total weight of the gel polymer electrolyte, in an amount of about 95 wt. % or greater.

10. A rechargeable battery comprising an anode, a cathode, a microporous separator separating said anode and said cathode, and a gel polymer electrolyte comprising:
    (i) a gel polymer which is the reaction product of (A) a poly(2-vinyl-pyridine-co-styrene) compound, and (B) an epoxy-group containing material, and
    (ii) a liquid electrolyte which contains an amount of an ionic salt effective to achieve ionic conductivity of about $1 \times 10^{-2}$ S/cm or less.

11. The rechargeable battery of claim 10, wherein the epoxy-group containing material is butanediol diglycidyl ether.

12. The rechargeable battery of claim 10, wherein the ionic salt is a lithium salt.

13. The rechargeable battery of claim 12, wherein the lithium salt is at least one selected from the group consisting of LiPF6, LiAsF6, LiClO4, LiN(CF3SO2)2, LiBF4, LiCF3SO3 and LiSbF6.

14. The rechargeable battery of claim 10, wherein the ionic salt is present in an amount effective to achieve an ionic conductivity of between about $1 \times 10^{-3}$ to about $1 \times 10^{-2}$ S/cm.

15. The rechargeable battery of claim 10, wherein material (B) is an epoxy-group containing material which is at least one selected from the group consisting of 3,4-epoxycyclohexylmethyl-3', 4'-epoxycyclohexane carboxylate, glycidyl dodecafluoroheptylether, polypropylene glycol diglycidyl ether, glycidyl dodecafluoroheptylether, butadiene diepoxide, butanediol diglycidyl ether, cyclo hexene oxide, cyclopentene oxide, diepoxy cyclooctane, ethylene glycol diglycidyl ether and 1,2-epoxy hexane.

16. The rechargeable battery of claim 10, wherein the gel polymer is present, based on the total weight of the gel polymer electrolyte, in an amount between about 1 wt. % to about 30 wt %.

17. The rechargeable battery of claim 10 or 16, wherein the liquid electrolyte is present, based on the total weight of the gel polymer electrolyte, in an amount between about 30 wt. % to about 99 wt. %.

18. The rechargeable battery of claim 10, wherein the liquid electrolyte is present, based on the total weight of the gel polymer electrolyte, in an amount of about 95 wt. % or greater.

* * * * *